(12) United States Patent
Yokohama (10) Patent No.: US 11,705,965 B2
(45) Date of Patent: Jul. 18, 2023

(54) OPTICAL COMMUNICATION DEVICE

(71) Applicant: Mitsubishi Electric Corporation, Tokyo (JP)

(72) Inventor: Yuji Yokohama, Tokyo (JP)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 0 days.

(21) Appl. No.: 17/516,704

(22) Filed: Nov. 2, 2021

(65) Prior Publication Data
US 2022/0166499 A1    May 26, 2022

(30) Foreign Application Priority Data
Nov. 20, 2020 (JP) .................. 2020-193419

(51) Int. Cl.
H04B 10/27 (2013.01)
H04B 10/03 (2013.01)

(52) U.S. Cl.
CPC ............. *H04B 10/03* (2013.01); *H04B 10/27* (2013.01)

(58) Field of Classification Search
CPC ......... H04B 10/03; H04B 10/27; H04B 10/40
See application file for complete search history.

(56) References Cited

U.S. PATENT DOCUMENTS

| | | | | |
|---|---|---|---|---|
| 8,897,653 B2 * | 11/2014 | Senoo | .................... | H04B 10/50 398/183 |
| 11,101,886 B1 * | 8/2021 | Liu | ...................... | H04B 10/079 |
| 2008/0095532 A1 * | 4/2008 | Yamaji | .................. | H04J 3/1694 398/17 |
| 2008/0166119 A1 | 7/2008 | Ryu et al. | | |
| 2012/0033963 A1 * | 2/2012 | Nose | .................... | H04L 12/2898 398/1 |

FOREIGN PATENT DOCUMENTS

JP    2004-32541 A    1/2004

OTHER PUBLICATIONS

"Case Examples of Trouble and Countermeaseures in PON System", NTT Technical Journal, Oct. 2011, pp. 62-65 (8 pages including English Translation).

* cited by examiner

*Primary Examiner* — Dzung D Tran
(74) *Attorney, Agent, or Firm* — Xsensus LLP (57) ABSTRACT

An ONU includes a communication unit, an abnormal light emission prevention unit, and a control unit that transmits a data signal and a transmission permission signal to the communication unit and transmits the transmission permission signal to the abnormal light emission prevention unit between a transmission start time and a transmission end time. When the transmission permission signal is received, the communication unit, transmits an optical signal to an OLT, and transmits an operation signal to the abnormal light emission prevention unit during the transmission of the optical signal. The abnormal light emission prevention unit transmits a stop signal to the communication unit when a difference between a time for which the transmission permission signal is received and a time for which the operation signal is received is greater than or equal to a threshold value. The communication unit stops when the stop signal is received.

3 Claims, 8 Drawing Sheets

OPTICAL COMMUNICATION DEVICE

CROSS-REFERENCE TO RELATED APPLICATION

This application claims priority to Japanese Patent Application No. 2020-193419, filed on Nov. 20, 2020, the disclosure of which is incorporated herein by reference in its entirety.

BACKGROUND OF THE INVENTION

1. Field of the Invention

The present disclosure relates to an optical communication device.

2. Description of the Related Art

There has been known a Passive Optical Network (PON) system as an optical communication system. The PON system includes an optical communication device (referred to also as a master station device) installed in a station of a telecommunications carrier and a plurality of optical communication devices (referred to also as slave station devices) on the subscribers' side (referred to also as slave stations' side). The master station device is referred to as an Optical Line Termination (OLT). The slave station device is referred to as an Optical Network Unit (ONU).

In the PON system, Time Division Multiplexing (TDM) is employed in order to prevent collision of optical signals. However, the collision of optical signals occurs when an optical signal is transmitted by an ONU to which a failure or the like has occurred. The occurrence of the collision of optical signals leads to communication abnormality in the PON system. In such a circumstance, a technology for inhibiting the communication abnormality has been proposed (see Patent Reference 1: Japanese Patent Application Publication No. 2004-32541). An optical transceiver device described in the Patent Reference 1 includes an optical transceiver and an optical output runaway prevention circuit. When the optical transceiver has transmitted an optical signal continuously for a predetermined period or longer, the optical output runaway prevention circuit has the optical signal transmission stopped. The optical transceiver includes a monitoring photoreceptor element. The monitoring photoreceptor element monitors the optical signal.

Further, countermeasures to be taken upon the occurrence of the communication abnormality are described in Non-patent Reference 1. See the Non-patent Reference 1 ("Case Examples of Trouble and Countermeasures in PON systems" <URL: https://www.ntt.co.jp/journal/1110/files/jn201110062.pdf>).

In the aforementioned technology, the monitoring photoreceptor element is provided in the device in order to inhibit the communication abnormality. However, providing the monitoring photoreceptor element in the device leads to an increase in the cost for the device.

SUMMARY OF THE INVENTION

The object of the present disclosure is to hold down the cost for an ONU executing the prevention of abnormal light emission.

An optical communication device according to an aspect of the present disclosure is provided. The optical communication device is a slave station device that communicates with a master station device. The optical communication device includes a communication unit, an abnormal light emission prevention unit, and a control unit that transmits a data signal and a transmission permission signal to the communication unit and transmits the transmission permission signal to the abnormal light emission prevention unit for a time period between a transmission start time and a transmission end time based on transmission band assignment information as information regarding transmission of an optical signal. When the transmission permission signal is received, the communication unit transduces the data signal into an optical signal, transmits the transduced optical signal to the master station device, and transmits an operation signal indicating that the communication unit is operating to the abnormal light emission prevention unit during the transmission of the transduced optical signal. The abnormal light emission prevention unit transmits a stop signal to the communication unit when a difference between a time for which the transmission permission signal is received and a time for which the operation signal is received is greater than or equal to a predetermined threshold value. The communication unit stops when the stop signal is received.

The optical communication device is a slave station device that communicates with a master station device. The optical communication device includes a communication unit, an abnormal light emission prevention unit, and a control unit that transmits a data signal and a transmission permission signal indicating transmission permission to the communication unit and transmits the transmission permission signal to the abnormal light emission prevention unit for a time period between a transmission start time and a transmission end time based on transmission band assignment information as information regarding transmission of an optical signal. When the transmission permission signal is received, the communication unit transduces the data signal into an optical signal and transmits the transduced optical signal to the master station device. The abnormal light emission prevention unit transmits a stop signal to the communication unit when the transmission permission signal is received again within a predetermined period since the reception of a previous transmission permission signal transmitted by the control unit based on the transmission start time. The communication unit stops when the stop signal is received.

The optical communication device is a slave station device that communicates with a master station device. The optical communication device includes a communication unit, an abnormal light emission prevention unit, and a control unit that transmits a data signal and a transmission permission signal to the communication unit and transmits the transmission permission signal to the abnormal light emission prevention unit for a time period between a transmission start time and a transmission end time based on transmission band assignment information as information regarding transmission of an optical signal. When the transmission permission signal is received, the communication unit transduces the data signal into an optical signal and transmits the transduced optical signal to the master station device. The abnormal light emission prevention unit transmits a stop signal to the communication unit when a time for which the transmission permission signal is received is less than or equal to a predetermined time. The communication unit stops when the stop signal is received.

According to the present disclosure, the cost for an ONU executing the prevention of abnormal light emission can be held down.

DETAILED DESCRIPTION OF THE INVENTION

Embodiments will be described below with reference to the drawings. The following embodiments are just examples and a variety of modifications are possible within the scope of the present disclosure.

First Embodiment

Figure 1:
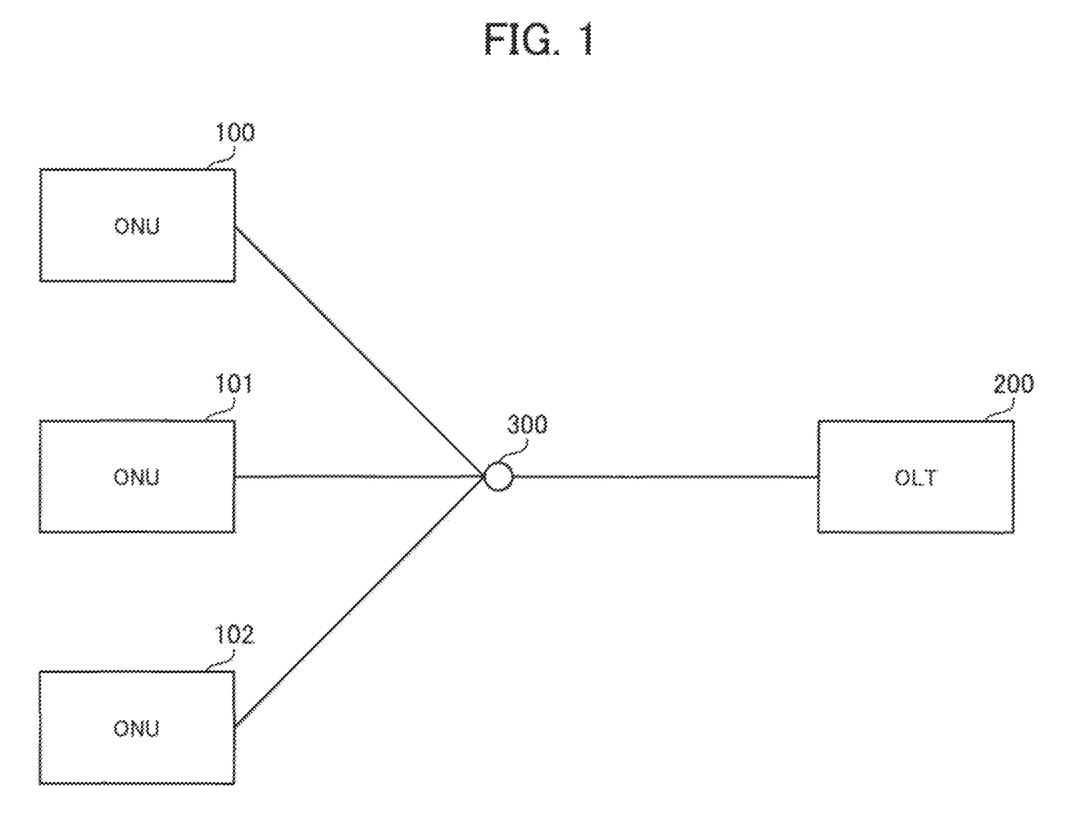
FIG. 1 is a diagram showing a PON system in a first embodiment.

FIG. 1 is a diagram showing a PON system in a first embodiment. The PON system includes ONUS 100, 101 and 102 and an OLT 200. The ONUS 100, 101 and 102 and the OLT 200 are connected together via a star coupler 300. Specifically, the ONUS 100, 101 and 102 and the OLT 200 are connected together by optical fiber cables via the star coupler 300. Then, the ONUS 100, 101 and 102 and the OLT 200 perform communication via the star coupler 300. Incidentally, three ONUS are shown in FIG. 1 as an example. The number of ONUS is not limited to three.

While illustration is left out, each ONU 100, 101, 102 is connected to a client device.

The ONUS 100, 101 and 102 have the same functions as each other. Therefore, the functions of the ONU 100 will be described in the first embodiment. Then, the description of the functions of the ONUS 101 and 102 will be left out.

Figure 2:
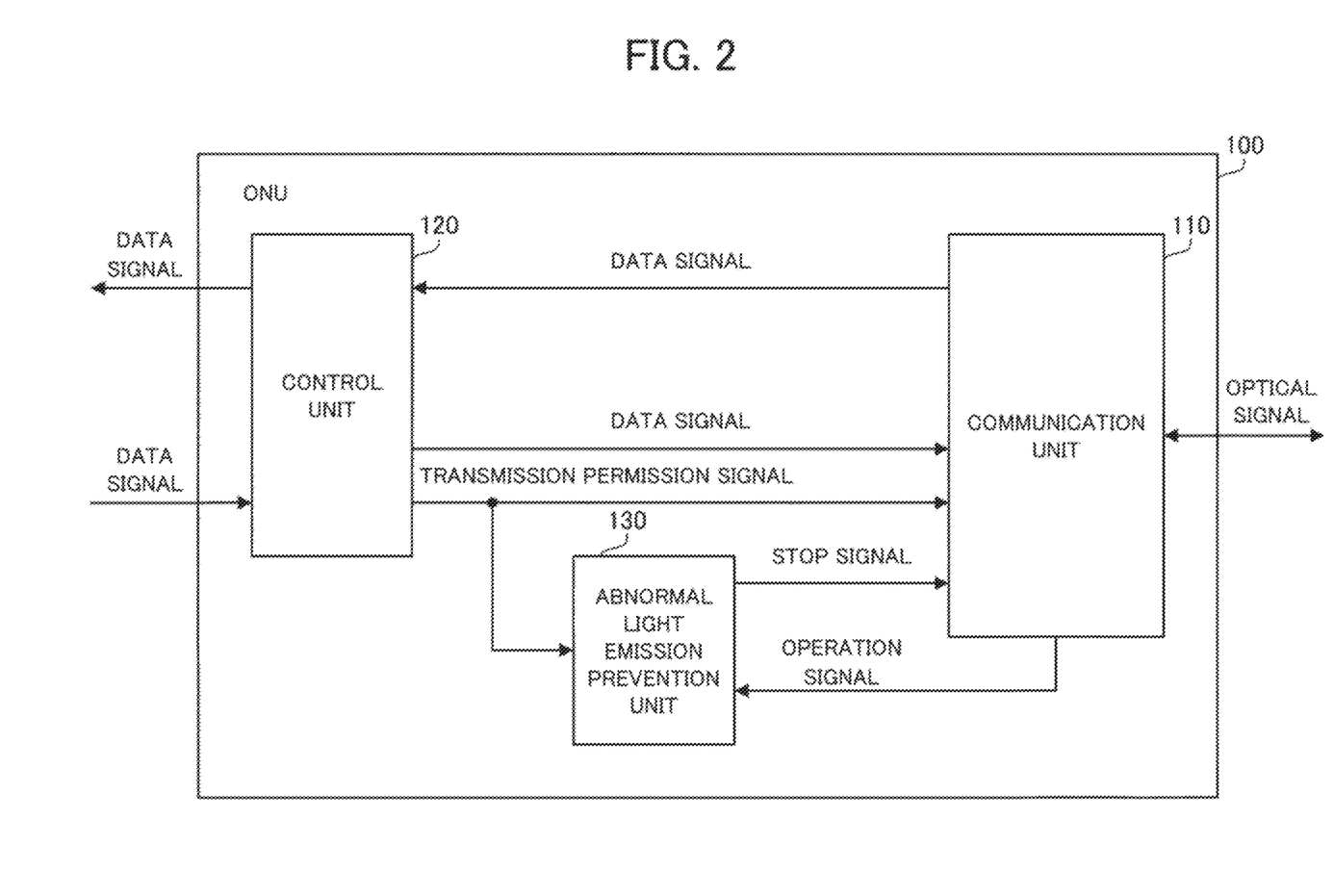
FIG. 2 is a diagram for explaining an ONU in the first embodiment.

FIG. 2 is a diagram for explaining the ONU in the first embodiment. The ONU 100 includes a communication unit 110, a control unit 120 and an abnormal light emission prevention unit 130.

The communication unit 110 may be implemented by a photodiode and a processing circuitry. The control unit 120 may be implemented by a processing circuitry. In the case where the control unit 120 is implemented by a processing circuitry, the control unit 120 may be referred to as a PON control circuitry. The abnormal light emission prevention unit 130 may be implemented by a processing circuitry. In the case where the abnormal light emission prevention unit 130 is implemented by a processing circuitry, the abnormal light emission prevention unit 130 may be referred to as an abnormal light emission prevention circuitry.

Further, part or all of the communication unit 110, the control unit 120 and the abnormal light emission prevention unit 130 may be implemented as a module of a program executed by a processor. For example, the program executed by the processor is referred to also as an abnormal light emission inhibition program. The abnormal light emission inhibition program has been recorded in a record medium, for example.

First, communication from the OLT 200 to the ONU 100 will be described below.

The communication unit 110 performs optical communication with the OLT 200. When an optical signal is received from the OLT 200, the communication unit 110 transduces the optical signal into an electric signal. This electric signal is referred to as a data signal. The data signal is received by the control unit 120. The control unit 120 transmits the data signal to the client device. Further, when the transduced data signal is transmission band assignment information, the communication unit 110 transmits the transmission band assignment information to the control unit 120. Accordingly, the control unit 120 receives the transmission band assignment information. Incidentally, the transmission band assignment information is information generated by the OLT 200 based on TDM. The transmission band assignment information is information regarding the transmission of the optical signal. The transmission band assignment information may be regarded as either a GATE frame or information included in a GATE frame.

Next, communication from the ONU 100 to the OLT 200 will be described below.

The control unit 120 receives a data signal from the client device. For a time period between a transmission start time and a transmission end time based on the transmission band assignment information, the control unit 120 transmits a transmission permission signal and the data signal transmitted by the client device to the communication unit 110 and transmits the transmission permission signal to the abnormal light emission prevention unit 130. Specifically, for a time period between the transmission start time and the transmission end time, the control unit 120 continues transmitting the data signal and the transmission permission signal to the communication unit 110 and continues transmitting the transmission permission signal to the abnormal light emission prevention unit 130. Incidentally, the transmission permission signal is a signal that indicates permission of the transmission. Here, the transmission start time and the transmission end time will be explained. The transmission band assignment information includes the transmission start time and band information, for example. The transmission end time is calculated by the control unit 120 based on the transmission start time and the band information. Alternatively, the transmission band assignment information includes the transmission start time and a transmission time. The transmission end time is calculated by the control unit 120 based on the transmission start time and the transmission time.

When the communication unit 110 receives the transmission permission signal, the communication unit 110 transduces the data signal (i.e., electric signal) into an optical signal and transmits the optical signal to the OLT 200. While transmitting the optical signal, the communication unit 110 transmits an operation signal to the abnormal light emission prevention unit 130. Incidentally, the operation signal is a signal indicating that the communication unit 110 is operating. The operation signal may also be represented as a signal indicating that the processing circuitry of the communication unit 110 is operating.

The abnormal light emission prevention unit 130 transmits a stop signal to the communication unit 110 when a difference between a time for which the transmission permission signal is received and a time for which the operation signal is received is greater than or equal to a predetermined threshold value. Incidentally, the case where the difference is greater than or equal to the threshold value is, for example, a case where the time for which the operation signal is received is longer than the time for which the transmission permission signal is received. Alternatively, the case where the difference is greater than or equal to the threshold value is, for example, a case where the time for which the operation signal is received is shorter than the time for which the transmission permission signal is received. When the difference is greater than or equal to the threshold value, it can be considered that the communication unit 110 has a failure. In this transmission, the stop signal is transmitted by means of latch transmission. Namely, the transmission of the stop signal is maintained by the abnormal light emission prevention unit 130. When the communication unit 110 receives the stop signal, the communication unit 110 stops. As above, the communication unit 110 shifts to a light emission stoppage state when the stop signal is received.

In contrast, when the difference between the time for which the transmission permission signal is received and the time for which the operation signal is received is less than the threshold value, the abnormal light emission prevention unit 130 judges that the communication unit 110 is operating normally. Namely, when the difference is less than the threshold value, the abnormal light emission prevention unit 130 does not transmit the stop signal.

Next, the communication from the ONUS 100, 101 and 102 to the OLT 200 will be described concretely.

Figure 3:
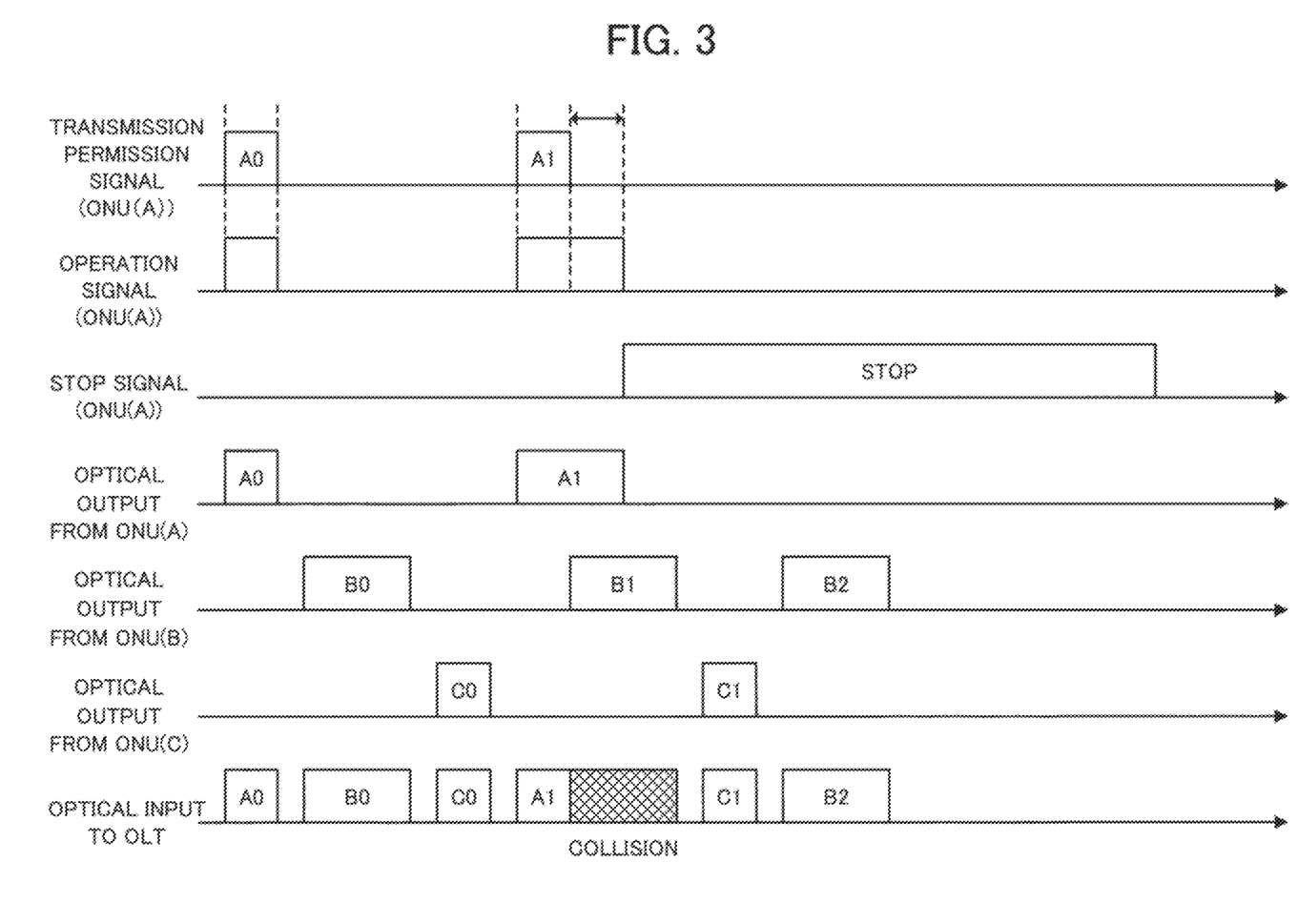
FIG. 3 is a diagram (No. 1) showing a concrete example of communication in the PON system in the first embodiment.

FIG. 3 is a diagram (No. 1) showing a concrete example of communication in the PON system in the first embodiment. FIG. 3 illustrates communication between the ONUS 100, 101 and 102 and the OLT 200 as an example. In this example, the ONU 100 can be represented as an ONU (A). The ONU 101 can be represented as an ONU (B). The ONU 102 can be represented as an ONU (C). The character "A" in FIG. 3 represents information related to the ONU (A). The character "B" in FIG. 3 represents information related to the ONU (B). The character "C" in FIG. 3 represents information related to the ONU (C).

The OLT 200 transmits the transmission band assignment information to the ONUS 100, 101 and 102. Accordingly, each ONU 100, 101, 102 is capable of transmitting an optical signal based on the transmission band assignment information.

For a time period between the transmission start time and the transmission end time based on the transmission band assignment information, the control unit 120 transmits a data signal and a transmission permission signal (A0) to the communication unit 110. For a time period between the transmission start time and the transmission end time based on the transmission band assignment information, the control unit 120 transmits the transmission permission signal (A0) to the abnormal light emission prevention unit 130.

The communication unit 110 transduces the data signal into an optical signal (A0) and transmits the optical signal (A0) to the OLT 200. Further, the communication unit 110 transmits the operation signal to the abnormal light emission prevention unit 130. The OLT 200 receives the optical signal (A0).

Since the difference between the time for which the transmission permission signal (A0) is received and the time for which the operation signal is received is less than the threshold value, the abnormal light emission prevention unit 130 judges that the communication unit 110 is operating normally.

The ONU 101 transmits an optical signal (B0) based on the transmission band assignment information. The OLT 200 receives the optical signal (B0).

The ONU 102 transmits an optical signal (C0) based on the transmission band assignment information. The OLT 200 receives the optical signal (C0).

The OLT 200 transmits the transmission band assignment information to the ONUS 100, 101 and 102.

For a time period between the transmission start time and the transmission end time based on the transmission band assignment information, the control unit 120 transmits a data signal and a transmission permission signal (A1) to the communication unit 110. For a time period between the transmission start time and the transmission end time based on the transmission band assignment information, the control unit 120 transmits the transmission permission signal (A1) to the abnormal light emission prevention unit 130.

The communication unit 110 transduces the data signal into an optical signal (A1) and transmits the optical signal (A1) to the OLT 200. The communication unit 110 transmits the operation signal to the abnormal light emission prevention unit 130. The OLT 200 receives the optical signal (A1). In this case, the communication unit 110 has a failure, and thus the communication unit 110 transmits the optical signal (A1) to the OLT 200 even though the communication unit 110 has not been received the transmission permission signal.

Since the difference between the time for which the transmission permission signal (A1) is received and the time for which the operation signal is received is greater than or equal to the threshold value, the abnormal light emission prevention unit 130 transmits the stop signal to the communication unit 110. Due to the stop signal, the communication unit 110 stops. Accordingly, the communication unit 110 stops the transmission of the optical signal. Then, the abnormal light emission is prevented in the ONU 100.

The ONU 101 transmits an optical signal (B1) based on the transmission band assignment information. The optical signal (B1) collides with the optical signal (A1).

The ONU 102 transmits an optical signal (C1) based on the transmission band assignment information. The OLT 200 receives the optical signal (C1).

The OLT 200 transmits the transmission band assignment information to the ONUS 101 and 102. Incidentally, the ONU 100 has stopped the communication. Therefore, the connection between the ONU 100 and the OLT 200 is in a link down state. Since the connection is in the link down state, the OLT 200 does not transmit the transmission band assignment information to the ONU 100.

The ONU 101 transmits an optical signal (B2) based on the transmission band assignment information. The OLT 200 receives the optical signal (B2).

Since the ONU 100 does not transmit the optical signal as above, a further collision of optical signals is avoided in the PON system. Accordingly, normal communication is realized in the PON system.

Figure 4:
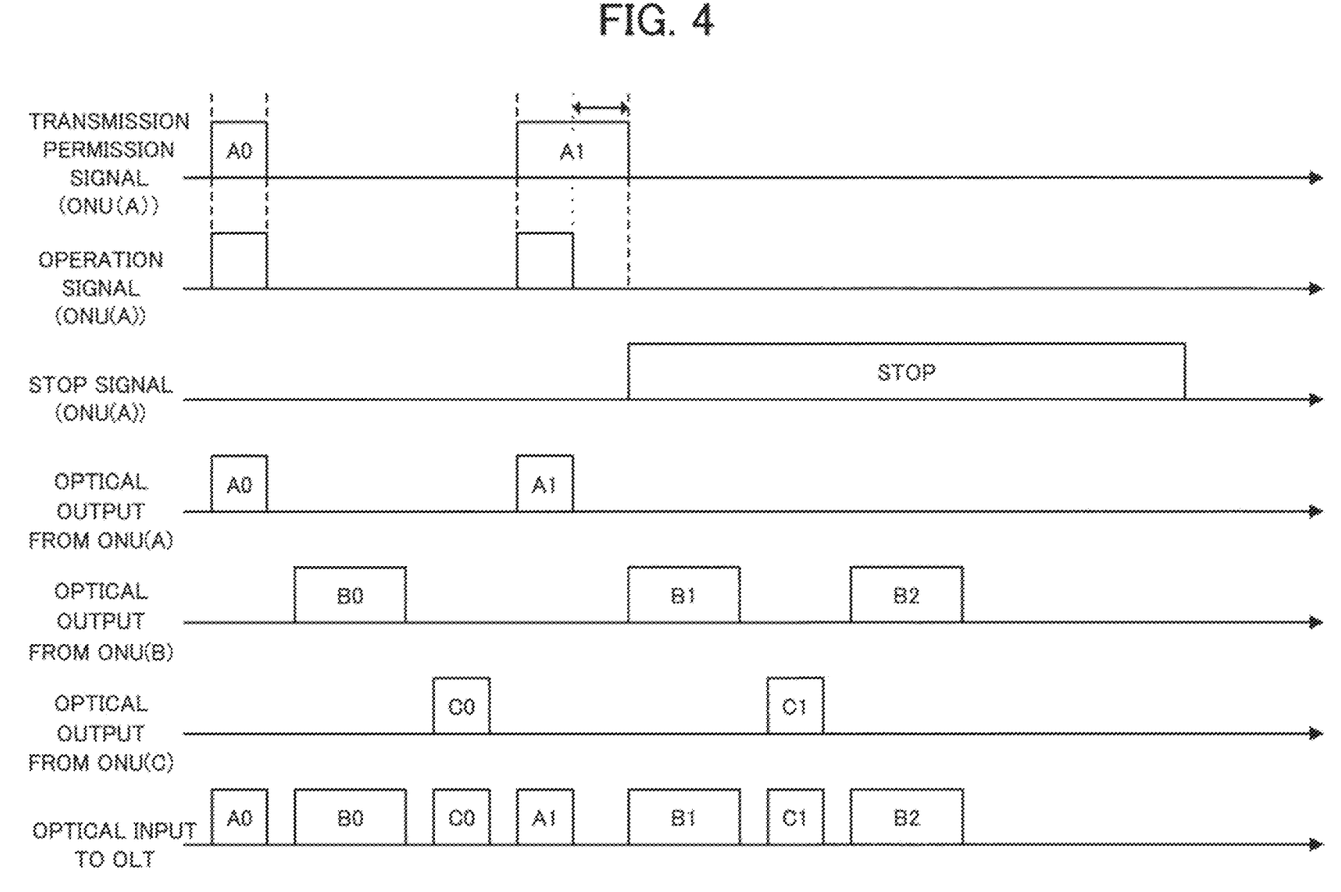
FIG. 4 is a diagram (No. 2) showing a concrete example of communication in the PON system in the first embodiment.

FIG. 4 is a diagram (No. 2) showing a concrete example of communication in the PON system in the first embodiment. FIG. 4 illustrates communication between the ONUS 100, 101 and 102 and the OLT 200 as an example.

The OLT 200 transmits the transmission band assignment information to the ONUS 100, 101 and 102.

For a time period between the transmission start time and the transmission end time based on the transmission band assignment information, the control unit 120 transmits a data signal and a transmission permission signal (A0) to the communication unit 110. For a time period between the transmission start time and the transmission end time based on the transmission band assignment information, the control unit 120 transmits the transmission permission signal (A0) to the abnormal light emission prevention unit 130.

The communication unit 110 transduces the data signal into an optical signal (A0) and transmits the optical signal (A0) to the OLT 200. Further, the communication unit 110 transmits the operation signal to the abnormal light emission prevention unit 130. The OLT 200 receives the optical signal (A0).

Since the difference between the time for which the transmission permission signal (A0) is received and the time for which the operation signal is received is less than the threshold value, the abnormal light emission prevention unit 130 judges that the communication unit 110 is operating normally.

The ONU 101 transmits an optical signal (B0) based on the transmission band assignment information. The OLT 200 receives the optical signal (B0).

The ONU 102 transmits an optical signal (C0) based on the transmission band assignment information. The OLT 200 receives the optical signal (C0).

The OLT 200 transmits the transmission band assignment information to the ONUS 100, 101 and 102.

For a time period between the transmission start time and the transmission end time based on the transmission band assignment information, the control unit 120 transmits a data signal and a transmission permission signal (A1) to the communication unit 110. For a time period between the transmission start time and the transmission end time based on the transmission band assignment information, the control unit 120 transmits the transmission permission signal (A1) to the abnormal light emission prevention unit 130.

The communication unit 110 transduces the data signal into an optical signal (A1) and transmits the optical signal (A1) to the OLT 200. The communication unit 110 transmits the operation signal to the abnormal light emission prevention unit 130. In this case, the communication unit 110 has a failure, and thus the communication unit 110 stops the transmission of the optical signal (A1) in the middle even though the communication unit 110 has been received the transmission permission signal. Accordingly, the OLT 200 cannot receive the whole of the data signal. The fact that the OLT 200 cannot receive the whole of the data signal means that abnormal communication has occurred in the PON system. Incidentally, the communication unit 110 stops the transmission of the operation signal in the middle since the communication unit 110 has stopped the transmission of the optical signal.

Since the difference between the time for which the transmission permission signal (A1) is received and the time for which the operation signal is received is greater than or equal to the threshold value, the abnormal light emission prevention unit 130 transmits the stop signal to the communication unit 110. Due to the stop signal, the communication unit 110 stops. Then, the abnormal light emission is prevented in the ONU 100.

The ONU 101 transmits an optical signal (B1) based on the transmission band assignment information. The OLT 200 receives the optical signal (B1).

The ONU 102 transmits an optical signal (C1) based on the transmission band assignment information. The OLT 200 receives the optical signal (C1).

The OLT 200 transmits the transmission band assignment information to the ONUS 101 and 102. Incidentally, the connection between the ONU 100 and the OLT 200 is in the link down state. Therefore, the OLT 200 does not transmit the transmission band assignment information to the ONU 100.

The ONU 101 transmits an optical signal (B2) based on the transmission band assignment information. The OLT 200 receives the optical signal (B2).

As above, normal communication is realized in the PON system by excluding the ONU 100 from the PON system. Further, since the ONU 100 does not transmit the optical signal, the OLT 200 is inhibited from receiving data in the incomplete state.

Incidentally, there is a possible way that the monitoring photoreceptor element is provide in the device in order to inhibit the communication abnormality. However, providing the monitoring photoreceptor element in the device leads to an increase in the cost for the device.

The ONU 100 is capable of inhibiting the communication abnormality in the PON system. Specifically, the inhibition of the communication abnormality is realized by the abnormal light emission prevention unit 130. The abnormal light emission prevention unit 130 is implemented as a module of the program executed by the processing circuitry or the processor. Here, the monitoring photoreceptor element is an expensive optical component. The processing circuitry is an electrical component. Thus, the processing circuitry is cheaper than the monitoring photoreceptor element. Accordingly, the ONU 100 including the abnormal light emission prevention unit 130 is capable of holding down the cost for the ONU 100. Further, when the abnormal light emission prevention unit 130 is implemented as a module of the program, it is unnecessary to newly add a component to the ONU 100. Accordingly, the ONU 100 including the abnormal light emission prevention unit 130 is capable of holding down the cost for the ONU 100.

Second Embodiment

Next, a second embodiment will be described below. In the second embodiment, the description will be given mainly of features different from those in the first embodiment. In the second embodiment, the description will be omitted for features in common with the first embodiment. FIGS. 1 and 2 will be referred to in the description of the second embodiment.

A PON system in the second embodiment includes ONUS 100a, 101 and 102 and the OLT 200.

Figure 5:
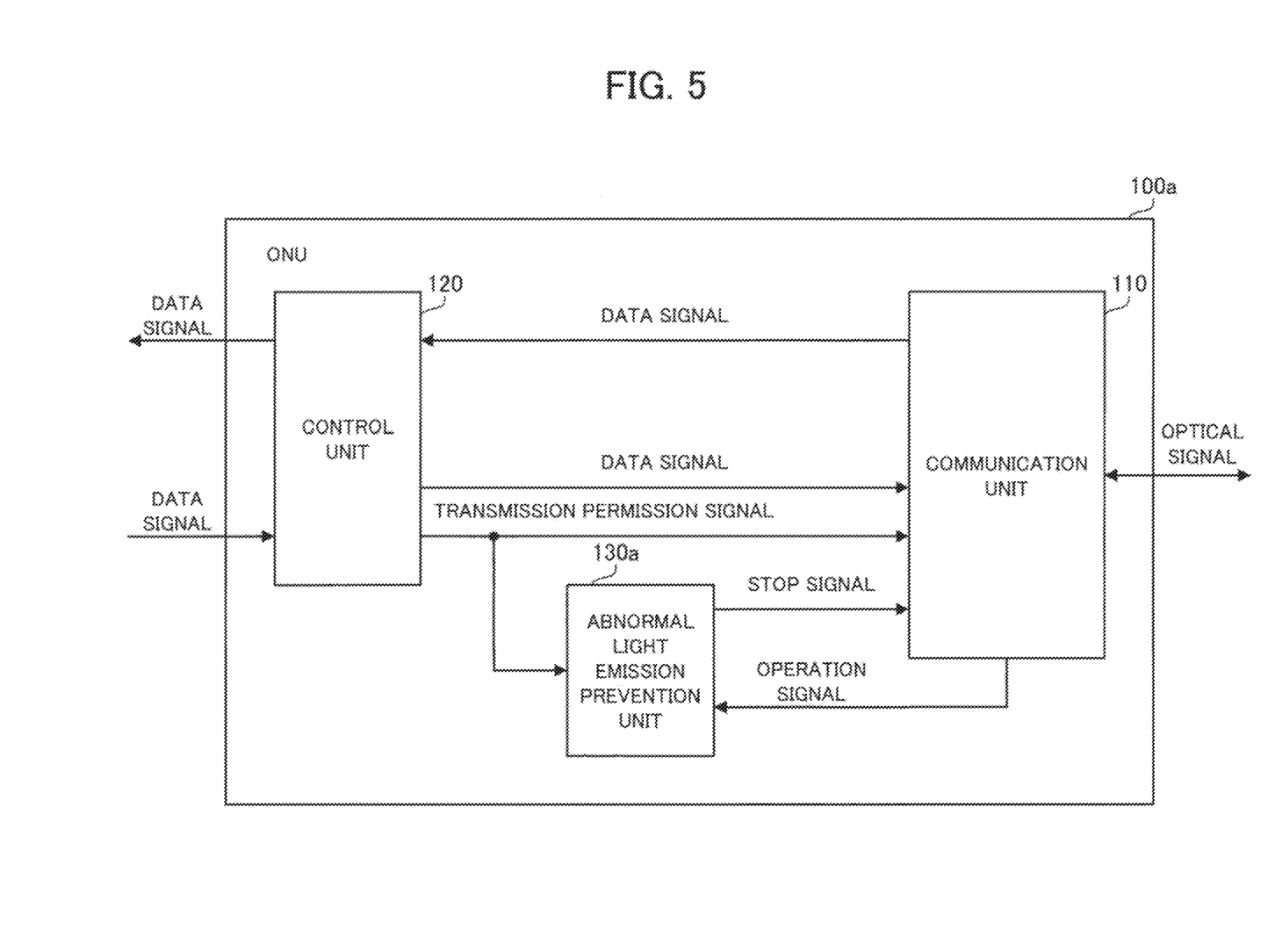
FIG. 5 is a diagram for explaining an ONU in the second embodiment.

FIG. 5 is a diagram for explaining the ONU in the second embodiment. Each component in FIG. 5 identical to a component shown in FIG. 2 is assigned the same reference character as in FIG. 2. The ONU 100a includes an abnormal light emission prevention unit 130a.

When the transmission permission signal is received again within a predetermined period since the reception of the previous transmission permission signal transmitted by the control unit 120 based on the transmission start time indicated by the transmission band assignment information, the abnormal light emission prevention unit 130a transmits the stop signal to the communication unit 110. In this transmission, the stop signal is transmitted by means of the latch transmission. Incidentally, the predetermined period may be referred to as a band update cycle.

Further, the reception of a plurality of transmission permission signals by the abnormal light emission prevention unit 130a within the predetermined period means that the communication unit 110 transmits the optical signal in a single-shot fashion. Therefore, when the abnormal light emission prevention unit 130a receives a plurality of transmission permission signals, the abnormal light emission prevention unit 130a is capable of detecting that the communication unit 110 is in an abnormal light emission state in the single-shot fashion.

The communication unit 110 of the ONU 100a does not necessarily have to transmit the operation signal to the abnormal light emission prevention unit 130a. In the following description, the communication unit 110 is assumed to transmit the operation signal.

Next, the communication from the ONUS 100a, 101 and 102 to the OLT 200 will be described concretely.

Figure 6:
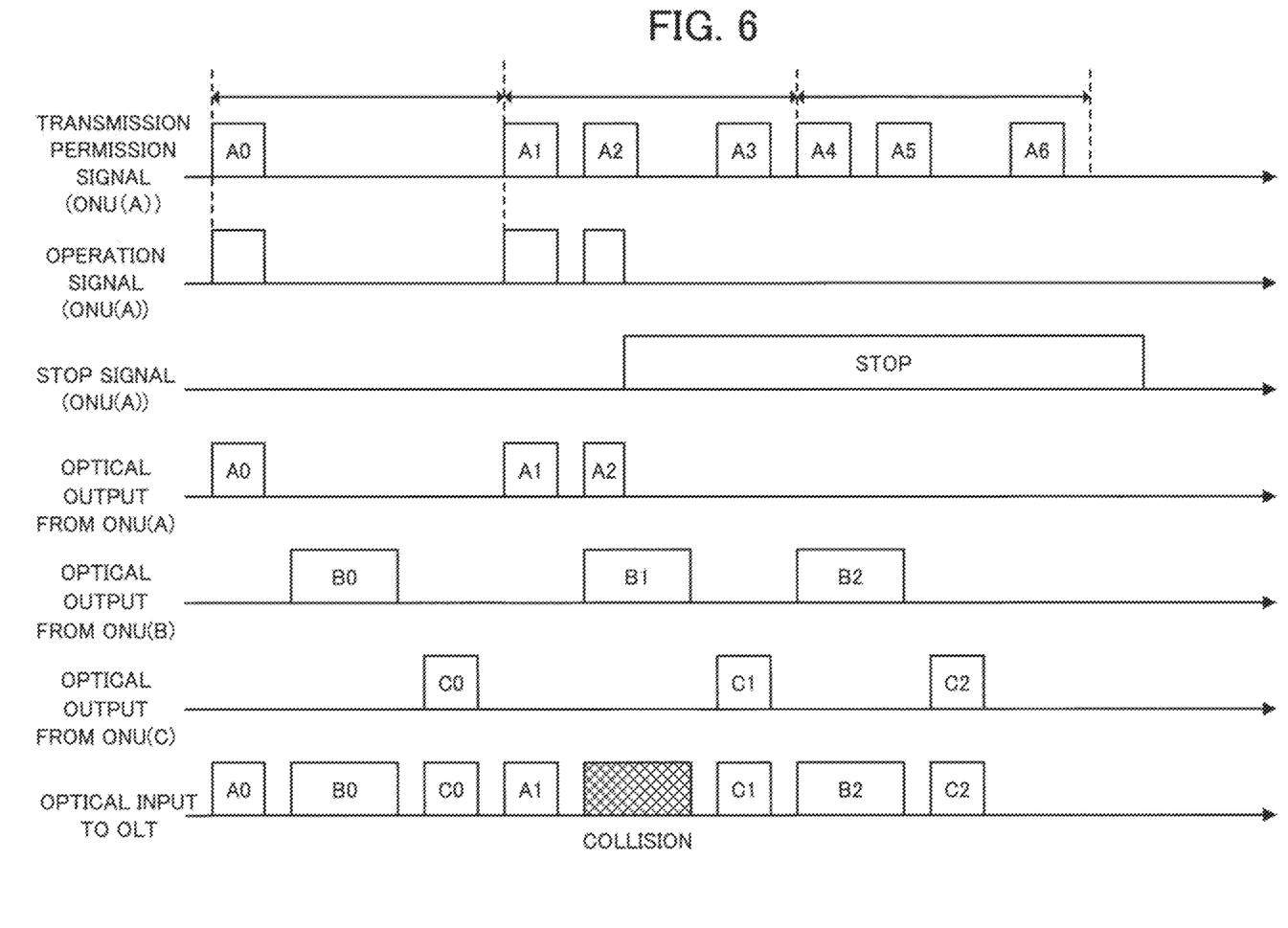
FIG. 6 is a diagram showing a concrete example of communication in a PON system in the second embodiment.

FIG. 6 is a diagram showing a concrete example of communication in the PON system in the second embodiment. FIG. 6 illustrates communication between the ONUS 100a, 101 and 102 and the OLT 200 as an example. In FIG. 6, the ONU 100a is represented as the ONU (A). The ONU 101 is represented as the ONU (B). The ONU 102 is represented as the ONU (C).

The OLT 200 transmits the transmission band assignment information to the ONUS 100a, 101 and 102.

For a time period between the transmission start time and the transmission end time based on the transmission band assignment information, the control unit 120 transmits a data signal and a transmission permission signal (A0) to the communication unit 110. For a time period between the transmission start time and the transmission end time based on the transmission band assignment information, the control unit 120 transmits the transmission permission signal (A0) to the abnormal light emission prevention unit 130a.

The communication unit 110 transduces the data signal into an optical signal (A0) and transmits the optical signal (A0) to the OLT 200. Further, the communication unit 110 transmits the operation signal to the abnormal light emission prevention unit 130a. The OLT 200 receives the optical signal (A0).

The abnormal light emission prevention unit 130a judges that the control unit 120 is operating normally since the abnormal light emission prevention unit 130a does not receive the transmission permission signal again within the predetermined period after the reception of the previous transmission permission signal (A0) transmitted by the control unit 120 based on the transmission start time indicated by the transmission band assignment information.

The ONU 101 transmits an optical signal (B0) based on the transmission band assignment information. The OLT 200 receives the optical signal (B0).

The ONU 102 transmits an optical signal (C0) based on the transmission band assignment information. The OLT 200 receives the optical signal (C0).

The OLT 200 transmits the transmission band assignment information to the ONUs 100a, 101 and 102.

For a time period between the transmission start time and the transmission end time based on the transmission band assignment information, the control unit 120 transmits a data signal and a transmission permission signal to the communication unit 110. For a time period between the transmission start time and the transmission end time based on the transmission band assignment information, the control unit 120 transmits the transmission permission signal to the abnormal light emission prevention unit 130a. In this case, due to a failure or the like of the control unit 120, the control unit 120 transmits a plurality of transmission permission signals (A1, A2 and A3) to the communication unit 110 and the abnormal light emission prevention unit 130a.

The communication unit 110 transduces the data signal into an optical signal (A1) and transmits the optical signal (A1) to the OLT 200. Further, the communication unit 110 transmits the operation signal to the abnormal light emission prevention unit 130a. The OLT 200 receives the optical signal (A1).

Since the communication unit 110 receives the transmission permission signal (A2) after transmitting the optical signal (A1), the communication unit 110 transmits an optical signal (A2).

Since the abnormal light emission prevention unit 130a receives the transmission permission signal (A2, A3) within the predetermined period after the reception of the transmission permission signal (A1) transmitted by the control unit 120 based on the transmission start time indicated by the transmission band assignment information, the abnormal light emission prevention unit 130a transmits the stop signal to the communication unit 110. Due to the stop signal, the communication unit 110 stops. Accordingly, the communication unit 110 stops the transmission of the optical signal. Then, the abnormal light emission is prevented in the ONU 100a.

The ONU 101 transmits an optical signal (B1) based on the transmission band assignment information. The optical signal (B1) collides with the optical signal (A2).

The ONU 102 transmits an optical signal (C1) based on the transmission band assignment information. The OLT 200 receives the optical signal (C1).

The OLT 200 transmits the transmission band assignment information to the ONUS 101 and 102. Incidentally, the connection between the ONU 100a and the OLT 200 is in the link down state. Therefore, the OLT 200 does not transmit the transmission band assignment information to the ONU 100a.

The ONU 101 transmits an optical signal (B2) based on the transmission band assignment information. The OLT 200 receives the optical signal (B2).

The ONU 102 transmits an optical signal (C2) based on the transmission band assignment information. The OLT 200 receives the optical signal (C2).

Incidentally, the control unit 120 transmits a plurality of transmission permission signals (A4, A5 and A6) to the communication unit 110. Since the control unit 120 has a failure, the control unit 120 transmits the plurality of transmission permission signals (A4, A5 and A6) even when the transmission band assignment information is not received. Since the communication unit 110 has shifted to the light emission stoppage state, the communication unit 110 does not transmit the optical signal.

Since the ONU 100a does not transmit the optical signal as above, a further collision of optical signals is avoided in the PON system. Accordingly, normal communication is realized in the PON system.

According to the second embodiment, the ONU 100a is capable of inhibiting the communication abnormality in the PON system. Specifically, the inhibition of the communication abnormality is realized by the abnormal light emission prevention unit 130a. The abnormal light emission prevention unit 130a is implemented as a module of the program executed by the processing circuitry or the processor. In the case where the abnormal light emission prevention unit 130a is implemented by the processing circuitry, the cost for the ONU 100a is held down. Accordingly, the ONU 100a including the abnormal light emission prevention unit 130a is capable of holding down the cost for the ONU 100a. Further, in the case where the abnormal light emission prevention unit 130a is implemented as a module of the program, it is unnecessary to newly add a component to the ONU 100a. Accordingly, the ONU 100a including the abnormal light emission prevention unit 130a is capable of holding down the cost for the ONU 100a.

Third Embodiment

Next, a third embodiment will be described below. In the third embodiment, the description will be given mainly of features different from those in the first embodiment. In the third embodiment, the description will be omitted for features in common with the first embodiment. FIGS. 1 and 2 will be referred to in the description of the third embodiment.

A PON system in the third embodiment includes ONUS 100b, 101 and 102 and the OLT 200.

Figure 7:
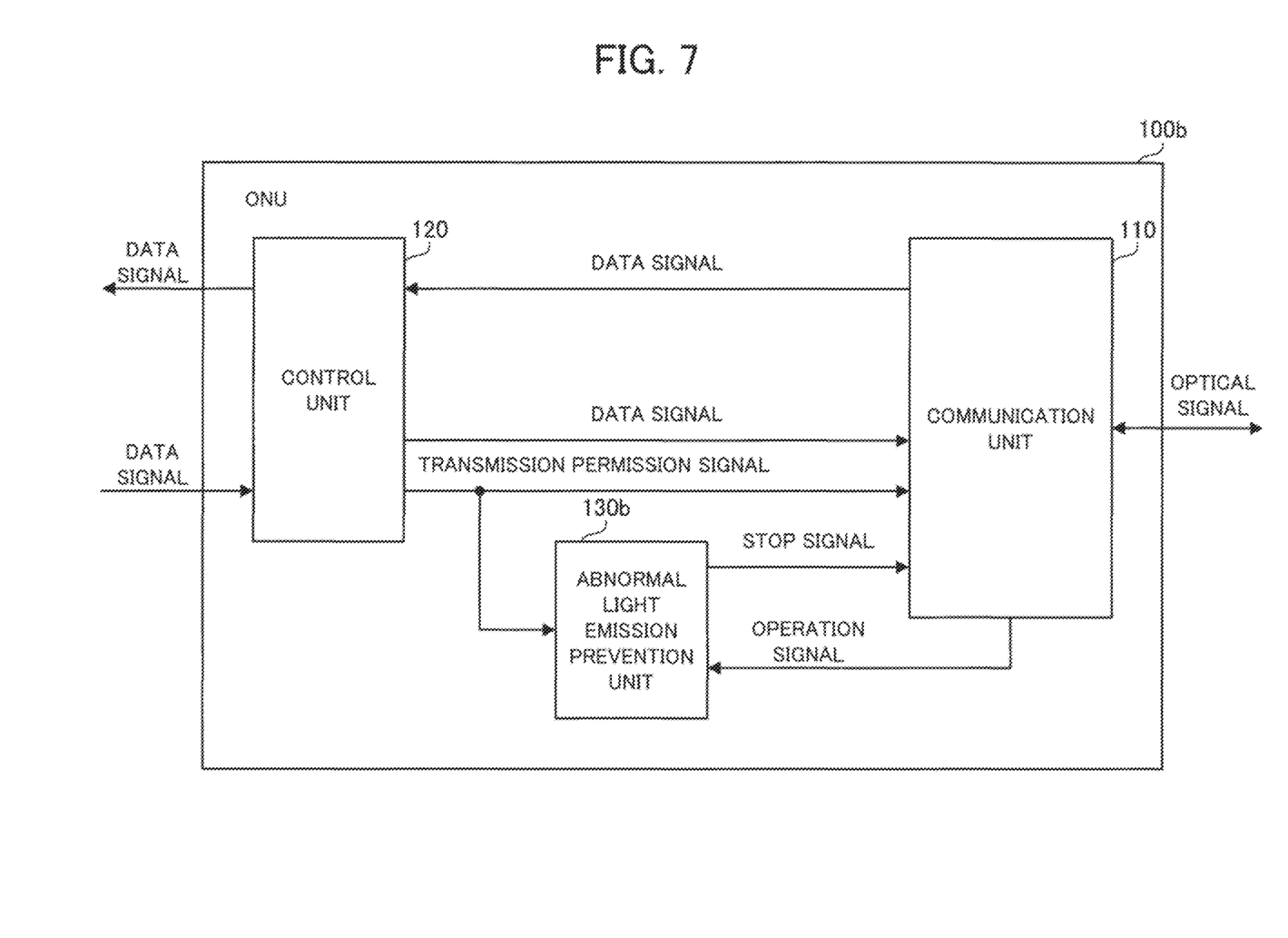
FIG. 7 is a diagram for explaining an ONU in the third embodiment.

FIG. 7 is a diagram for explaining the ONU in the third embodiment. Each component in FIG. 7 identical to a component shown in FIG. 2 is assigned the same reference character as in FIG. 2. The ONU 100b includes an abnormal light emission prevention unit 130b.

The abnormal light emission prevention unit 130b transmits the stop signal to the communication unit 110 when the time for which the transmission permission signal is received is less than or equal to a predetermined time. In this transmission, the stop signal is transmitted by means of the latch transmission. Incidentally, the predetermined time can be a minimum time specified in the PON system, for example.

The communication unit 110 of the ONU 100b does not necessarily have to transmit the operation signal to the abnormal light emission prevention unit 130b. In the following description, the communication unit 110 is assumed to transmit the operation signal.

Next, the communication from the ONUS 100b, 101 and 102 to the OLT 200 will be described concretely.

Figure 8:
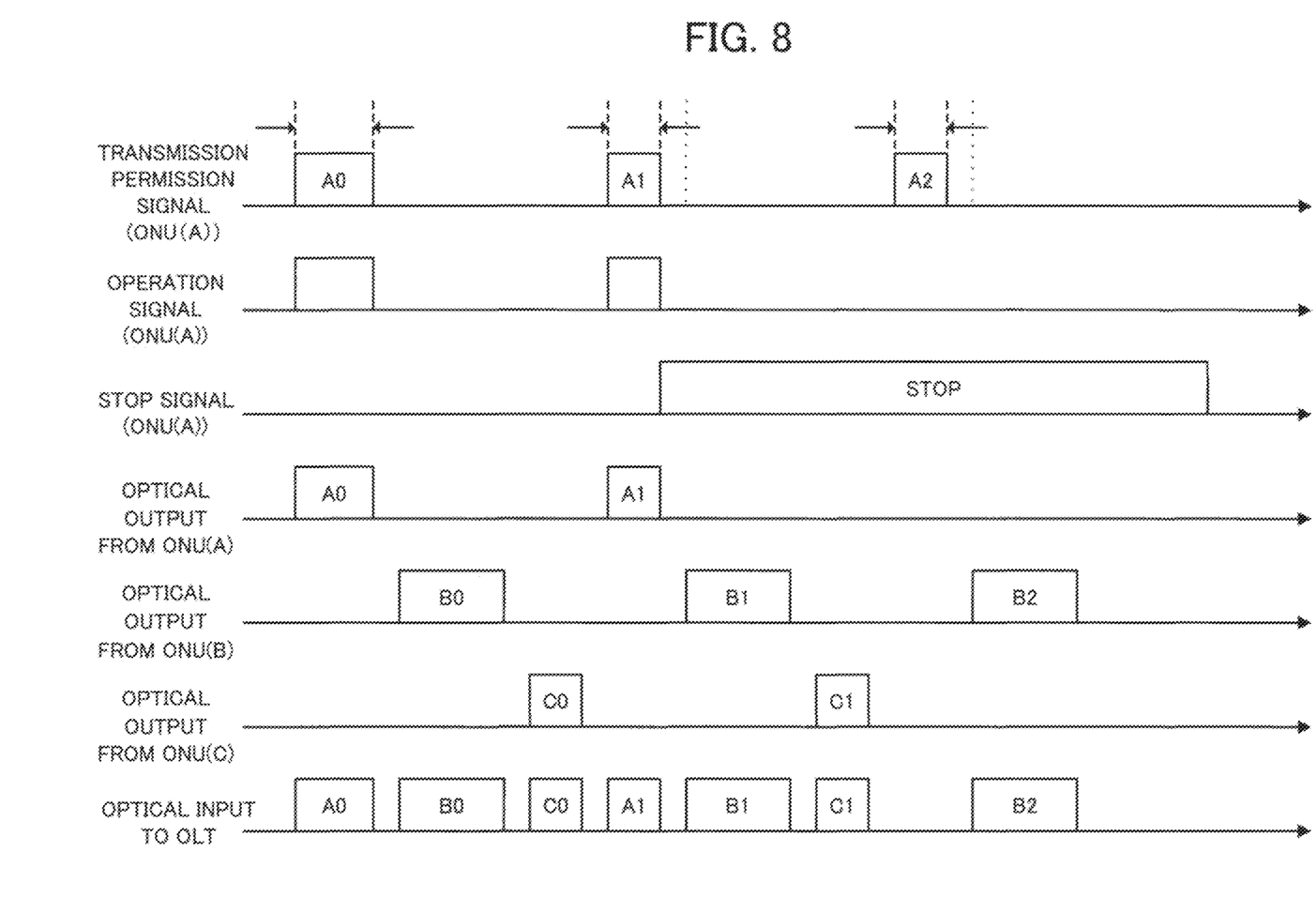
FIG. 8 is a diagram showing a concrete example of communication in a PON system in the third embodiment.

FIG. 8 is a diagram showing a concrete example of communication in the PON system in the third embodiment. FIG. 8 illustrates communication between the ONUS 100b, 101 and 102 and the OLT 200 as an example. In FIG. 8, the ONU 100b is represented as the ONU (A). The ONU 101 is represented as the ONU (B). The ONU 102 is represented as the ONU (C).

The OLT 200 transmits the transmission band assignment information to the ONUS 100b, 101 and 102.

For a time period between the transmission start time and the transmission end time based on the transmission band assignment information, the control unit 120 transmits a data signal and a transmission permission signal (A0) to the communication unit 110. For a time period between the transmission start time and the transmission end time based on the transmission band assignment information, the control unit 120 transmits the transmission permission signal (A0) to the abnormal light emission prevention unit 130b.

The communication unit 110 transduces the data signal into an optical signal (A0) and transmits the optical signal (A0) to the OLT 200. Further, the communication unit 110 transmits the operation signal to the abnormal light emission prevention unit 130b. The OLT 200 receives the optical signal (A0).

The abnormal light emission prevention unit 130b judges that the control unit 120 is operating normally since the time for which the transmission permission signal is received exceeds the predetermined time.

The ONU 101 transmits an optical signal (B0) based on the transmission band assignment information. The OLT 200 receives the optical signal (B0).

The ONU 102 transmits an optical signal (C0) based on the transmission band assignment information. The OLT 200 receives the optical signal (C0).

The OLT 200 transmits the transmission band assignment information to the ONUS 100b, 101 and 102.

For a time period between the transmission start time and the transmission end time based on the transmission band assignment information, the control unit 120 transmits a data signal and a transmission permission signal (A1) to the communication unit 110. For a time period between the transmission start time and the transmission end time based on the transmission band assignment information, the control unit 120 transmits the transmission permission signal (A1) to the abnormal light emission prevention unit 130b. In this case, since the control unit 120 has a failure, the transmission time of the transmission permission signal is less than or equal to the predetermined time. Accordingly, the communication unit 110 stops the transmission of an optical signal (A1) corresponding to the data signal in the middle. Therefore, the OLT 200 cannot receive the whole of the data signal. The fact that the OLT 200 cannot receive the whole of the data signal can mean that abnormal communication has occurred in the PON system.

Since the time for which the transmission permission signal is received is less than or equal to the predetermined time, the abnormal light emission prevention unit 130b transmits the stop signal to the communication unit 110. Due to the stop signal, the communication unit 110 stops. Then, the abnormal light emission is prevented in the ONU 100b.

The ONU 101 transmits an optical signal (B1) based on the transmission band assignment information. The OLT 200 receives the optical signal (B1).

The ONU 102 transmits an optical signal (C1) based on the transmission band assignment information. The OLT 200 receives the optical signal (C1).

The OLT 200 transmits the transmission band assignment information to the ONUS 101 and 102. Incidentally, the connection between the ONU 100b and the OLT 200 is in the link down state. Therefore, the OLT 200 does not transmit the transmission band assignment information to the ONU 100b.

The ONU 101 transmits an optical signal (B2) based on the transmission band assignment information. The OLT 200 receives the optical signal (B2).

Incidentally, the control unit 120 transmits a transmission permission signal (A2) to the communication unit 110. Since the control unit 120 has a failure, the control unit 120 transmits the transmission permission signal (A2) even when the transmission band assignment information is not received. Since the communication unit 110 has shifted to the light emission stoppage state, the communication unit 110 does not transmit the optical signal.

As above, normal communication is realized in the PON system by excluding the ONU 100b from the PON system. Further, since the ONU 100b does not transmit the optical signal, the OLT 200 is inhibited from receiving data in the incomplete state.

According to the third embodiment, the ONU 100b is capable of inhibiting the communication abnormality in the PON system. Specifically, the inhibition of the communication abnormality is realized by the abnormal light emission prevention unit 130b. The abnormal light emission prevention unit 130b is implemented as a module of the program executed by the processing circuitry or the processor. In the case where the abnormal light emission prevention unit 130b is implemented by the processing circuitry, the cost for the ONU 100b is held down. Accordingly, the ONU 100b including the abnormal light emission prevention unit 130b is capable of holding down the cost for the ONU 100b. Further, in the case where the abnormal light emission prevention unit 130b is implemented as a module of the program, it is unnecessary to newly add a component to the ONU 100b. Accordingly, the ONU 100b including the abnormal light emission prevention unit 130b is capable of holding down the cost for the ONU 100b.

Features in the embodiments described above can be appropriately combined with each other.

What is claimed is:

1. An optical communication device as a slave station device that communicates with a master station device, comprising:
   a communicating circuitry;
   an abnormal light emission preventing circuitry; and
   a controlling circuitry to transmit a data signal and a transmission permission signal to the communicating circuitry and to transmit the transmission permission signal to the abnormal light emission preventing circuitry for a time period between a transmission start time and a transmission end time based on transmission band assignment information as information regarding transmission of an optical signal, wherein
   when the transmission permission signal is received, the communicating circuitry transduces the data signal into an optical signal, transmits the transduced optical signal to the master station device, and transmits an operation signal indicating that the communicating circuitry is operating to the abnormal light emission preventing circuitry during the transmission of the transduced optical signal,
   the abnormal light emission preventing circuitry transmits a stop signal to the communicating circuitry when a difference between a time for which the transmission permission signal is received and a time for which the operation signal is received is greater than or equal to a predetermined threshold value, and
   the communicating circuitry stops when the stop signal is received.

2. An optical communication device as a slave station device that communicates with a master station device, comprising:
   a communicating circuitry;
   an abnormal light emission preventing circuitry; and
   a controlling circuitry to transmit a data signal and a transmission permission signal indicating transmission permission to the communicating circuitry and to transmit the transmission permission signal to the abnormal light emission preventing circuitry for a time period between a transmission start time and a transmission end time based on transmission band assignment information as information regarding transmission of an optical signal, wherein
   when the transmission permission signal is received, the communicating circuitry transduces the data signal into an optical signal and transmits the transduced optical signal to the master station device,
   the abnormal light emission preventing circuitry transmits a stop signal to the communicating circuitry when the transmission permission signal is received again within a predetermined period since the reception of a previous transmission permission signal transmitted by the controlling circuitry based on the transmission start time, and
   the communicating circuitry stops when the stop signal is received.

3. An optical communication device as a slave station device that communicates with a master station device, comprising:
   a communicating circuitry;
   an abnormal light emission preventing circuitry; and
   a controlling circuitry to transmit a data signal and a transmission permission signal to the communicating circuitry and to transmit the transmission permission signal to the abnormal light emission preventing circuitry for a time period between a transmission start time and a transmission end time based on transmission band assignment information as information regarding transmission of an optical signal, wherein
   when the transmission permission signal is received, the communicating circuitry transduces the data signal into an optical signal and transmits the transduced optical signal to the master station device,
   the abnormal light emission preventing circuitry transmits a stop signal to the communicating circuitry when a time for which the transmission permission signal is received is less than or equal to a predetermined time, and
   the communicating circuitry stops when the stop signal is received.

* * * * *